Dec. 26, 1967  E. H. CORNISH ET AL  3,360,648
APPARATUS FOR IMPARTING AN OSCILLATING ROTARY MOTION
TO A CABLE PASSING THROUGH AN IRRADIATION MEANS
Filed Nov. 16, 1964
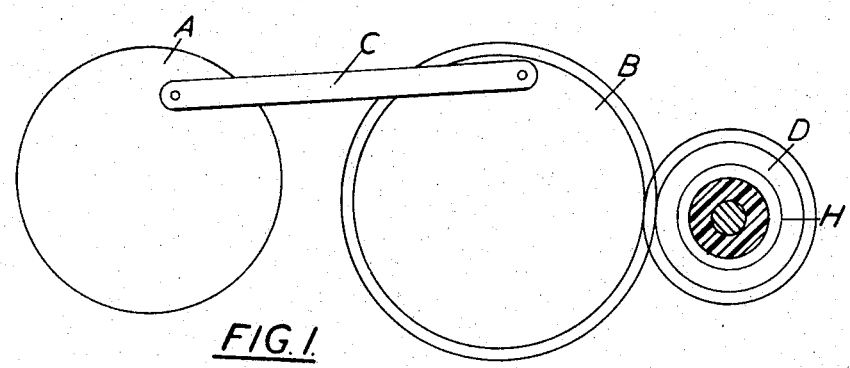
FIG. 1.
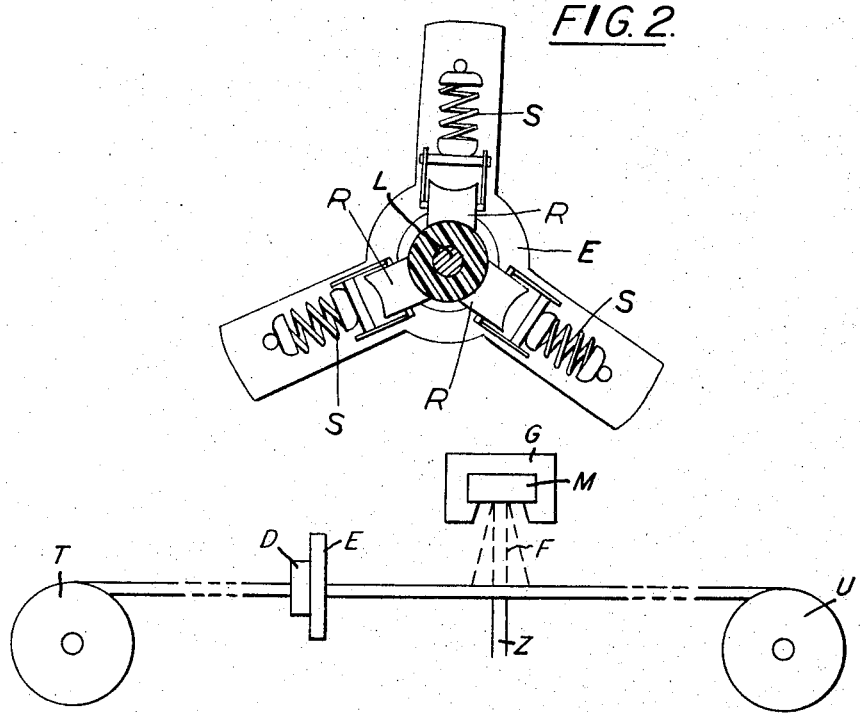
FIG. 2.
FIG. 3.
Inventors
ERIC H. CORNISH
ALAN R. GILBERT
DEREK M. CUTTING
By
Attorney

United States Patent Office 3,360,648
Patented Dec. 26, 1967

3,360,648
APPARATUS FOR IMPARTING AN OSCILLATING ROTARY MOTION TO A CABLE PASSING THROUGH AN IRRADIATION MEANS
Eric Haydn Cornish, Alan Richard Gilbert, and Derek Maurice Cutting, London, England, assignors to International Standard Electric Corporation, New York, N.Y., a corporation of Delaware
Filed Nov. 16, 1964, Ser. No. 411,277
Claims priority, application Great Britain, Dec. 13, 1963, 49,430/63
5 Claims. (Cl. 250—52)

ABSTRACT OF THE DISCLOSURE

Homogeneous irradiation by electrons of all portions of the plastic cable insulation is provided by applying an oscillating rotary motion or twist to the cable about the longitudinal axis as it passes through the irradiation zone.

---

This invention relates to the manufacture of electric cable.

The electron bombardment of the plastic insulation of cables (intended usually to cross-link the insulation and so render it more heat resistant) is usually carried out by passing the cable through a region in which high energy electrons issuing from an accelerator impinge on the cable from one direction only.

If the diameter of the cable is small compared with the electron range, simple single-sided bombardment will give satisfactory irradiation. However, if the diameter of the cable is of the same order as, or greater than, the range of the electrons in its material, the irradiation will not be homogeneous and some parts of the cable may not be treated at all.

According to the invention there is provided cable processing equipment including means for providing an irradiation zone, means for passing a cable longitudinally through said irradiation zone, and means for imparting to a said cable an oscillating rotary motion about the longitudinal axis of the cable as it passes through said irradiation zone, whereby any inhomogeneity in the irradiation of said cable is minimised.

An embodiment of the invention will be described with reference to the accompanying drawings, in which:

FIG. 1 shows the drive mechanism for imparting an oscillating rotary motion.

FIG. 2 shows a roller carrier driven by the mechanism of FIG. 1 for oscillating the cable, and FIG. 3 schematically shows the cable feeding and irradiating mechanism.

Referring to FIG. 1, a wheel A is driven at constant angular velocity by an electric motor (not shown). A connecting rod C imparts an oscillating rotary motion to gearwheel B, which moves through about 90°. Gearwheel D, in constant mesh with gearwheel B, has half the number of teeth of gearwheel B, and therefore rotates through twice the angle 180° for each oscillation of B. A hole H through the center of gearwheel D allows the cable to be drawn through so that the cable and gearwheel D are concentric.

A roller carrier E shown in FIG. 2 is attached concentrically to gearwheel D and oscillates with it. Rubber covered rollers R are pressed inwardly by springs S and grip the cable passing through the hole H. The cable is free to move axially, the rollers R then rotating, but is subject to torsional forces as the carrier oscillates.

In operation, while the cable is passed at uniform speed from a supply reel T to a take-up reel U as shown in FIG. 3, it is gripped by the rollers R close to the irradiation area and oscillated through 180° about its longitudinal axis L. The oscillations take place against the torsional stiffness of the cable the ends (supply reel, take-up reel, etc.) being fixed with respect to this oscillating movement. It is of course necessary that a sufficient length of unsupported cable is allowed between the twisting gear and the reels, so that torsional movement can take place, and this will be a function of the cable diameter and of its construction.

The radiations are arranged to be effective in an area or zone Z, shown in FIG. 3, having a width at least equal to the diameter of the cable. The speed of passage of the cable through the area depends upon the length of the area and is arranged so that several, usually at least three, rotations through 180° of each point on the cable are obtained while it is in the area. The radiations may be scanned along the length of the cable in accordance with current well known practice such as an electron beam F generated by a source G and scanned by suitable scanning means such as magnetic coils M.

It is of course possible to use more than one source of radiations and to rotate the cable through less than 180°, while still achieving the above object of complete area coverage of the cable insulation.

As a result of this twisting operation in which the cable is rotated first in one direction and then in the other, it is possible to avoid the rotation of cable drums, about an axis at right angles to their longitudinal axis, which is an undesirable feature of other mechanical solutions to the problem.

It is to be understood that the following description of specific examples of this invention is not to be considered as a limitation of its scope.

What we claim is:

1. Cable processing equipment including irradiation means provided on irradiation zone, means for feeding a cable along its longitudinal axis through said irradiation zone, and cable gripping and driving means for imparting to said cable an oscillating rotary motion about said longitudinal axis of the cable as it passes slidably through said gripping and driving means and through said irradiation zone, whereby the irradiation of said cable is distributed relatively homogeneously.

2. Equipment as claimed in claim 1 in which the cable is passed through said irradiation zone between a supply reel and a take-up reel, each said reel being fixed with respect to said oscillating rotary cable motion so that only the cable between said reels is oscillated, whereby said motion takes place against the torsional stiffness of the cable.

3. Equipment as claimed in claim 2 and comprising means for scanning said irradiation zone along the longitudinal axis of the cable.

4. Equipment as claimed in claim 3 in which said irradiation zone is obtained from a single irradiation source, and said cable oscillating means provides rotation of said cable through 180° about its longitudinal axis.

5. Equipment as claimed in claim 4 in which the means for imparting said oscillating rotary motion comprises a gear wheel having a hole for the passage of said cable, driving means for oscillating said gear wheel, a plurality of friction rollers secured to said gear wheel around said hole, each roller being inwardly urged towards one another so as to bear on said cable passing therebetween so as to transmit the oscillations thereto while permitting longitudinal movement of the cable therethrough.

References Cited

UNITED STATES PATENTS

| | | | |
|---|---|---|---|
| 2,708,378 | 5/1955 | Smith | 214—338 |
| 2,858,441 | 10/1958 | Gale | 250—49.5 |
| 3,246,147 | 4/1966 | Skala | 250—49.5 |

WILLIAM F. LINDQUIST, *Primary Examiner.*

RALPH G. NILSON, *Examiner.*